United States Patent [19]

Meacham

[11] 3,831,973

[45] Aug. 27, 1974

[54] VEHICLE OCCUPANT RESTRAINT SYSTEM

[75] Inventor: George B. K. Meacham, Birmingham, Mich.

[73] Assignee: Eaton Corporation, Cleveland, Ohio

[22] Filed: Dec. 8, 1972

[21] Appl. No.: 313,283

[52] U.S. Cl............. 280/150 AB, 74/492, 280/87 R
[51] Int. Cl........................................... B60r 21/08
[58] Field of Search .......... 280/150 AB, 87 R, 87 A

[56] References Cited
UNITED STATES PATENTS

| | | | |
|---|---|---|---|
| 3,506,281 | 4/1970 | Berryman | 280/150 AB |
| 3,552,770 | 1/1971 | Berryman | 280/150 AB |
| 3,580,603 | 5/1971 | Chute | 280/150 AB |
| 3,618,979 | 11/1971 | Gulette | 280/150 AB |
| 3,674,284 | 7/1972 | Lohr | 280/150 AB |
| 3,680,884 | 8/1972 | Stephenson | 280/150 AB |
| 3,715,131 | 2/1973 | Hurley | 280/150 AB |
| 3,744,817 | 7/1973 | Ousset | 280/150 AB |

Primary Examiner—David Schonberg
Assistant Examiner—John P. Silverstrim
Attorney, Agent, or Firm—Teagno & Toddy

[57] ABSTRACT

A safety system for vehicle driver restraint of the type using a collapsed inflatable confinement mounted on the steering column. The confinement is inflated by a collision sensor-actuated explosive charge which activates a fluid pressure source in one embodiment and fluid is discharged to the confinement through a diffuser disposed centrally and annularly about the reservoir. The annular fluid source is nonrotatably attached to the steering column mast jacket and a rotary fluid pressure seal is provided between the diffuser and the steering column mast jacket. In one embodiment of the invention, the fluid pressure supply is a solid propellant gas generator nonrotatably mounted to the steering column mast jacket. In another embodiment, the fluid pressure source is a toroidally shaped reservoir containing fluid stored under pressure.

6 Claims, 3 Drawing Figures

VEHICLE OCCUPANT RESTRAINT SYSTEM

BACKGROUND OF THE INVENTION

The present invention relates generally to a vehicle occupant restraint system of the type having an inflatable confinement which is expanded by fluid supplied thereto under pressure to restrain movement of an occupant of the vehicle during a collision. The system of the present invention relates more specifically to a restraint system mounted on the steering column for restraining the vehicle driver during a collision.

The inflatable confinemant of the present invention has a collapsed, nonoperative condition for storage in the steering wheel at a position generally directly in front of the driver. Upon occurrence of a collision, sensors activate means for releasing pressureized fluid stored in a pressure vessel or reservoir, thereby permitting pressureized fluid to flow through a diffuser to the interior of the inflatable confinement. In order that the system may function to expand the inflatable confinemant in a sufficiently short time duration to have the bag fully inflated before contact with the driver, experience has shown that the system must be capable of fully inflating within 90 milliseconds after onset of a collision. This requires that a volume of fluid, sufficient to inflate the confinement, be stored as closely as possible to the confinement and at relatively high pressures.

In order to provide a suitable fluid pressure reservoir having the capacity to store the required volume of compressed fluid at such high pressures, it has been necessary to make the reservoirs of thick-wall construction and therefore the reservoirs are heavy relative to the steering wheel.

Furthermore, the reservoirs of previous steering column mounted systems have not been easily adaptable for stationary mounting without incorporation of extremely complicated rotary seals, to permit passage of the gas from the reservoir to the steering wheel mounted diffuser. This has been due to the cylindrical shape of the reservoir of previous systems with the longer dimension of the reservoir arranged diametrically of the steering wheel. Thus, it has been desirable to find a means for providing fluid pressure reservoir which could be easily mounted either to the steering shaft, to rotate with the shaft and wheel, or in a stationary position on the steering column mast jacket.

SUMMARY OF THE PRESENT INVENTION

The present invention provides a solution to the above-described problems relating to an inflatable restraint system for protecting the driver of a vehicle in a collision. In the system of the present invention a fluid pressure reservoir has a relatively small volume and is charged with inflating fluid at relatively high pressures. Upon the onset of a collision, sensors activate means for releasing the fluid from the reservoir to discharge the fluid through a diffuser for inflating the expandible confinement in front of the driver. The reservoir of the system used in the present invention has an annular configuration and is mounted centrally of the steering column, with a diffuser disposed centrally of and axially adjacent the pressure reservoir. The inflatable bag is disposed initially in the collapsed position in sealing engagement around the outer periphery of the reservoir. Upon the occurrence of a collision, a sensor activates an initiator charge which bursts a frangible portion of the reservoir wall located on the inner periphery of the toroidal shape, such that the high pressure fluid is released into the central region of the toroidal reservoir and flows axially through the diffuser into and expands the inflatable bag.

The preferred toroidal shape of the reservoir permits the reservoir to be conveniently concentrically mounted to the steering column without interferring with the steering shaft or mounting of the steering wheel.

In another embodiment of the invention the fluid supplying annular solid propellant gas generator is nonrotatably concentrically attached to the steering column mast jacket and the diffuser is attached to the steering shaft for rotation with the shaft by fastening means passing through the center of the annular gas-generator. In either embodiment a rotary seal is provided between the diffuser and the outer periphery of the reservoir to prevent unwanted escape of fluid in a direction away from the diffuser. The confinement in either embodiment is attached around the outer periphery of the diffuser and rotates therewith.

The present invention thus provides a vehicle driver system mounted on the steering column and having an annular fluid pressure supply concentrically mounted on the steering column and shaped so as to occupy a minimum of space and to permit easy mounting of the steering wheel to the steering shaft.

DETAILED DESCRIPTION

Figure 1:
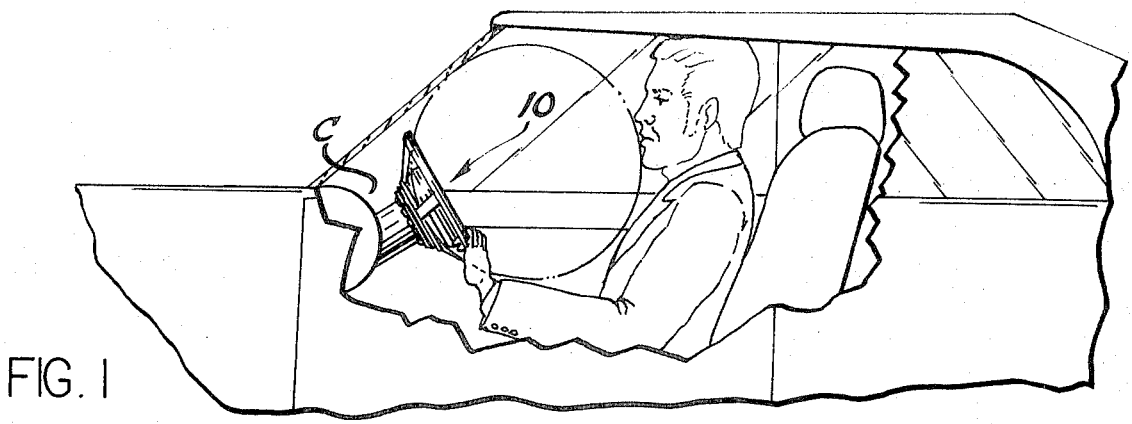
FIG. 1 is a side view of the driver seating compartment of a vehicle showing the steering column with the system of the present invention mounted thereon in front of the driver.

Referring now to FIG. 1, the system of the present invention is shown as it appears when installed within the steering wheel on the steering column of a vehicle. The system has an inflatable confinement 10, shown in FIG. 1 in solid outline in the collapsed inoperative condition, and in dashed-line in the expanded operative position. The system of FIG. 1 is activated upon a signal from suitable sensors (not shown) in response to the onset of a collision.

Figure 2:
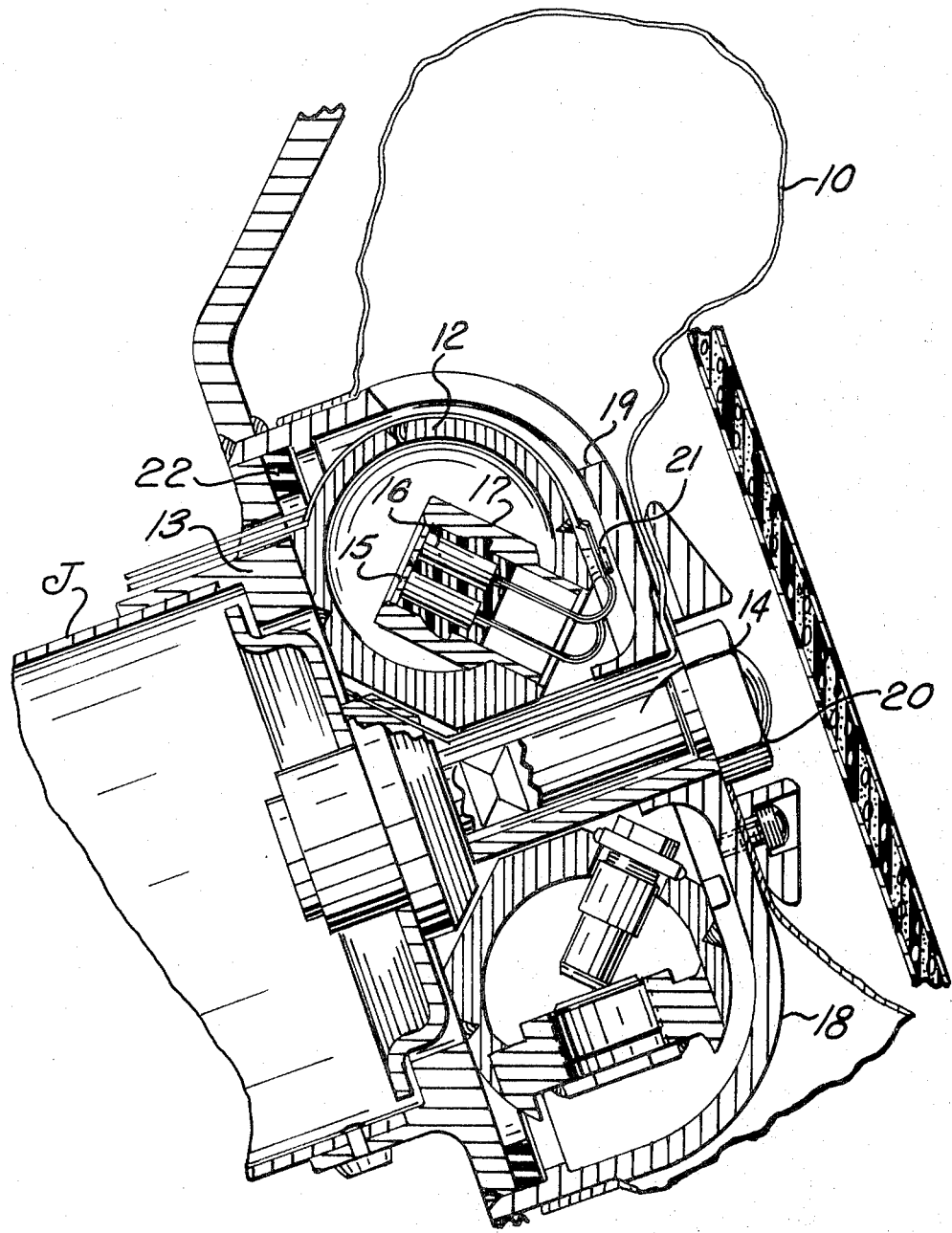
FIG. 2 is a cross-section of one embodiment of the invention showing the annular reservoir of pressurized fluid mounted nonrotatably on the steering column mast jacket.

Referring now to FIG. 2, the system is shown in preferred form wherein the fluid pressure source, in the form of an annular, preferably toroidal, reservoir 12 is nonrotatably attached by means of an attachment ring 13 welded thereto and received over the steering column mast jacket J of the vehicle and fastened to the mast jacket in a manner preventing rotation therebetween. The annular reservoir 12 has a substantially toroidal shape and is disposed over the steering shaft extension 14 such that the shaft extension 14 passes centrally through the reservoir.

The reservoir 12 has a frangible portion 15 provided in the wall thereof and located on the inner periphery thereof, which frangible portion ruptures upon activation of an initiator, preferably an explosive charge 16 in response to signal from collision sensors (not shown). In the preferred practice of the invention, the explosive charge 16 is disposed in a housing 17 extending into the interior of the reservoir from the inner periphery of the toroidal cross-section, and the frangible portion 15 is disposed on the inner end of the housing 17.

A cup-shaped diffuser 18 having a central aperture therein is received axially over the steering shaft extension 14 and over the outer periphery of the reservoir 12. The diffuser is positioned axially adjacent the reservoir and is secured onto the steering shaft for rotation therewith by fastening means, preferably in the form of a nut 20 threaded over the steering shaft 14. The diffuser 18 has a plurality of slots, or apertures, 19 formed radially outwardly therethrough for permitting the fluid from the reservoir to escape into the confinement 10. The initiator 16 and frangible portion 15 are positioned on the inner periphery of the reservoir such that, upon activation of the explosive charge, frangible portion 15 discharges the pressurized fluid to the central region of the diffuser initially and the fluid must then flow radially outwardly between the diffuser and reservoir to reach the diffuser passages 19. If desired, spoilers in the form of tabs 21 may be provided on the outer surface of the reservoir in the region of gas flow between the reservoir and the diffuser. The tabs 21 serve not only as spoilers, but also trap particles of the explosive charge and frangible portion 15.

A rotary seal 22 is provided about the inner periphery of the margin of the cup-shaped diffuser and the outer periphery of the steering column mast jacket J. The rotary seal 22 serves to prevent escape of the gas between the diffuser and the mast jacket, thus forcing the fluid to flow through the diffuser apertures 19 and into the expandable confinement 10. In the embodiment of FIG. 2, the expandable confinement, or bag 10, has an opening therein with the margin of the opening received over the outer periphery of the diffuser and attached thereto, adjacent the free margin of the diffuser, in fluid pressure-sealing arrangement.

Figure 3:
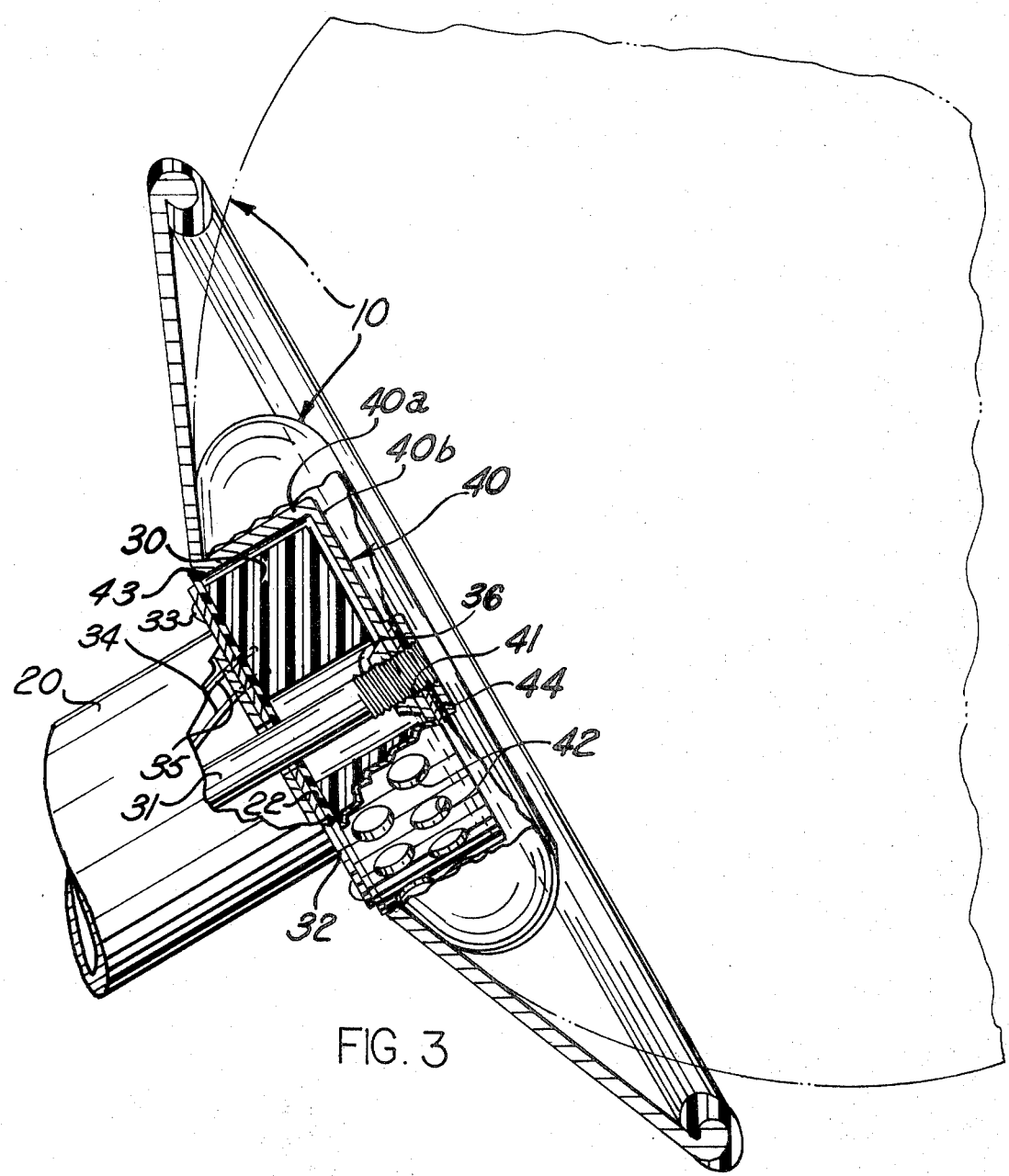
FIG. 3 is a view similar to FIG. 2 and shows another embodiment of the invention in which the fluid source is an annular solid propellant gas generator mounted nonrotatably on the steering column mast jacket.

Referring now to FIG. 3, an alternate embodiment of the invention is illustrated wherein the source of pressurized fluid is a gas generator. An ignitable propellant 30 having an annular configuration is provided and is received over the storing shaft 31 and attached to the plate 32 by suitable fastening means 33 as, for example, bolts or machine screws passing through the plate 32. If desired the propellant 30 may have an attachment plate 30 integrally mounted thereto for convenience of attachment to the annular plate 32. The propellant has the customary electrical leads 34 and 35 extending therefrom for connection to a suitable collision sensor (not Shown) for activating the propellant charge.

In the presently preferred practice of the invention, the steering shaft 31 incorporates suitable fastening provisions as, for example, threads 36 are provided on the end thereof for permitting attachment thereto.

A diffuser 40 having a cup-shaped configuration with an aperture, or hole, 41 formed centrally therein is received over the steering shaft 31, with the shaft passing through the hole 41 and the inner surface of the aperture in the cup-shaped diffuser the aperture being threaded and engaged with the threads on the end of the steering shaft. The diffuser in the presently preferred practice has a sylindrical portion 40a and a closed portion 40b having a substantially planar configuration and formed at right angles to the cylindrical portion 40a. The cylindrical portion 40a has a plurality of fluid passages in the form of apertures 42 provided therethrough to permit radial passage of the pressurized gas from propellant in the interior portion of the diffuser to the exterior thereof.

A rotary seal means 43 is provided within the diffuser at the axial periphery of the cylindrical portion and is disposed intermediate the diffuser and the plate 32 to prevent unwanted escape of gas into the vehicle passenger compartment from between the diffuser and the plate 32. In the presently preferred practice of the invention, the diffuser is secured onto the steering shaft to rotate therewith by nut 44 threaded over the steering shaft for securing the diffuser thereto. However, it will be readily apparent to those having ordinary skill in the art that other types of fastening means may be used if desired.

The inflatable confinement 10 has an opening therein with the margin thereof received over the outer periphery of the diffuser and is attached thereto by any convenient means but in a manner providing a fluid pressure sealing engagement therebetween. The steering wheel for the vehicle of the present invention may be either secured to the outer periphery of the diffuser by spokes S as illustrated in FIG. 2, or may have a central disc for attachment to the diffuser. In the present invention the diffuser serves a dual purpose first, that of providing a rotating gas diffuser and, secondly, as a structural member for attachment of the steering wheel thereto.

In the as-installed state the confinement is in the collapsed inoperative condition. Upon experiencing a collision the sensor detects the collision and, in response thereto, provides an electrical signal sufficient to ignite the solid propellant type gas generating element. Upon firing of the gas generator, the gas flows radially outwardly, through the passages in the diffuser and into the confinement causing inflation thereof to the expanded operative condition.

The present invention thus provides a novel arrangment for an inflatable vehicle occupant restraint system of the type attached to the steering column of the vehicle for providing driver restraint in a collision. The system of the present invention utilizes a rotating cup-shaped diffuser having radial passages for flow of fluid to the confinement and is received over an annular stationary fluid source means which is received concentrically over the steering shaft and rigidly mounted to the steering mast jacket.

Modifications and variations of the present invention will be apparent to those having ordinary skill in the art and the invention is limited only by the scope of the following claims:

What is claimed is:

1. Safety apparatus for restraining movement of the driver of a vehicle in a collision comprising:
   a. an inflatable confinement having a collapsed inoperative position and an expanded operative position in which the confinement is positioned to contact the vehicle driver and restrain movement thereof, said confinement being disposed about the vehicle steering wheel and mounted on the vehicle steering shaft to rotate therewith;
   b. annular fluid source means nonrotatably mounted on the mast jacket of the vehicle steering column and operable upon activation thereof to supply pressurized gas for inflating said confinement;
c. diffuser means disposed in the path of flow from said fluid source means, said diffuser being mounted on the vehicle steering shaft for rotation therewith, and having a generally cup-shaped configuration with a plurality of circumferentially spaced radially disposed passages therethrough, said fluid source means being disposed centrally within said cup-shaped configuration and said confinement having an opening therein with the margin thereof received over the outer periphery of said diffuser and engaged therearound in fluid sealing relationship;
d. fluid sealing means disposed intermediate said diffuser means and the vehicle steering column mast jacket in a manner permitting relative rotation and fluid-pressure sealing engagement therebetween; and
e. means responsive to a collision of said vehicle and operatively connected to said fluid source means for activating same and inflating said confinement to the expanded operative position.

2. The apparatus defined in claim 1, wherein said diffuser means has a cylindrical portion and has the closed end of the said cup-shape formed substantially planar and at right angles to said cylindrical portion with said fluid passages formed in said cylindrical portion.

3. The apparatus defined in claim 1, wherein said diffuser means has an aperture formed centrally therein of said cup-shape and the vehicle steering shaft is received through said aperture with the diffuser secured thereto.

4. The safety apparatus defined in claim 1, wherein said fluid pressure source means is disposed concentrically about the vehicle steering shaft.

5. The safety apparatus defined in claim 1, wherein said fluid pressure source means includes a fluid reservoir with pressurized gas stored therein and has;
   a. said reservoir having a toroidal configuration with the steering shaft passing through the center thereof;
   b. frangible means operable to release fluid from said reservoir upon activation by said collision responsive means.

6. The safety apparatus defined in claim 1, wherein said fluid pressure source means includes a gas generator having;
   a. an annularly shaped solid propellant; and
   b. explosive means operable to ignite said propellant in response to a signal from said collision responsive means.

* * * * *